:::

(12) United States Patent
Hasegawa

(10) Patent No.: US 12,330,665 B2
(45) Date of Patent: Jun. 17, 2025

(54) VEHICLE CONTROL DEVICE

(71) Applicant: DENSO CORPORATION, Kariya (JP)

(72) Inventor: Kosuke Hasegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 984 days.

(21) Appl. No.: 17/076,028

(22) Filed: Oct. 21, 2020

(65) Prior Publication Data

US 2021/0031792 A1 Feb. 4, 2021

Related U.S. Application Data

(63) Continuation of application No. PCT/JP2019/016846, filed on Apr. 19, 2019.

(30) Foreign Application Priority Data

Apr. 25, 2018 (JP) .................................. 2018-084257

(51) Int. Cl.
*B60W 50/023* (2012.01)
*B60R 16/023* (2006.01)
(Continued)

(52) U.S. Cl.
CPC .......... *B60W 50/023* (2013.01); *B60R 16/023* (2013.01); *B60R 16/0231* (2013.01); *B60W 50/0205* (2013.01); *B60W 50/029* (2013.01); *B60W 60/001* (2020.02); *G06F 11/2028* (2013.01); *G07C 5/0808* (2013.01)

(58) Field of Classification Search
CPC ........... B60W 50/023; B60W 50/0205; B60W 50/029; B60W 50/04; G05D 1/0061; G05D 1/0088; G05D 1/021; G05D 1/0214; G05D 1/0221; G05D 1/0223; G06F 11/2028
See application file for complete search history.

(56) References Cited

U.S. PATENT DOCUMENTS

2002/0099487 A1* 7/2002 Suganuma .......... B60R 16/0232
  701/1
2003/0120401 A1 6/2003 Bauer et al.
(Continued)

FOREIGN PATENT DOCUMENTS

CN 105253076 A 1/2016
DE 10032179 A1 1/2002
(Continued)

*Primary Examiner* — Christian Chace
*Assistant Examiner* — Nicholas Stryker
(74) *Attorney, Agent, or Firm* — Harness, Dickey & Pierce, P.L.C.

(57) ABSTRACT

A control execution unit is connected both a main bus and a sub bus, and includes an execution unit and a selection unit. The execution unit performs vehicle control according to a selected manipulated variable being either a main manipulated variable from a main processing unit connected to the main bus or a sub manipulated variable from a sub processing unit connected to the sub bus. The selected manipulated variable is set to the main manipulated variable in an initial state, and the selection unit switches over the selected manipulated variable from the main manipulated variable to the sub manipulated variable when communication performed via the main bus satisfies a preset switchover condition.

9 Claims, 16 Drawing Sheets

(51) Int. Cl.
   *B60W 50/02*   (2012.01)
   *B60W 50/029*  (2012.01)
   *B60W 60/00*   (2020.01)
   *G06F 11/20*   (2006.01)
   *G07C 5/08*    (2006.01)

(56) References Cited

U.S. PATENT DOCUMENTS

| | | | | |
|---|---|---|---|---|
| 2012/0320927 | A1* | 12/2012 | Katou | H04L 12/4625 |
| | | | | 370/401 |
| 2016/0009235 | A1* | 1/2016 | Joyce | B60R 16/03 |
| | | | | 701/24 |
| 2019/0340116 | A1* | 11/2019 | Miyauchi | G06F 11/203 |
| 2020/0125441 | A1* | 4/2020 | Omori | B60R 16/02 |
| 2021/0146938 | A1* | 5/2021 | Sari | G06F 11/2038 |

FOREIGN PATENT DOCUMENTS

| | | | |
|---|---|---|---|
| JP | H0597004 A | | 4/1993 |
| JP | 2017196965 A | | 11/2017 |
| WO | WO-2016155763 A1 | * | 10/2016 |

\* cited by examiner

FIG. 2

| | TRANSMISSION DIRECTION | | TRANSMISSION INFO |
|---|---|---|---|
| | SENDING ENTITY | RECEIVING ENTITY | |
| MAIN BUS | MAIN ECU | ACT SYSTEM ECU | MAIN MANIPULATED VARIABLE |
| | MAIN ECU | ACT SYSTEM ECU, HMI SYSTEM ECU | SWITCHOVER COMMAND (SWITCHOVER REQUIRED/UNREQUIRED) |
| | ACT SYSTEM ECU, HMI SYSTEM ECU | MAIN ECU | MAIN BUS FAILURE NOTIFICATION (PRESENCE/ABSENCE OF FAILURE) |
| SUB BUS | SUB ECU | ACT SYSTEM ECU | SUB MANIPULATED VARIABLE |
| | SUB ECU | ACT SYSTEM ECU, HMI SYSTEM ECU | SUB STATE NOTIFICATION (PRESENCE/ABSENCE OF ABNORMALITY) |
| | ACT SYSTEM ECU, HMI SYSTEM ECU | SUB ECU | SUB BUS FAILURE NOTIFICATION (PRESENCE/ABSENCE OF FAILURE) |

VEHICLE CONTROL DEVICE

CROSS-REFERENCE TO RELATED APPLICATIONS

This application is a continuation application of PCT/JP2019/016846 filed on Apr. 19, 2019, which designated the U.S and claims the benefit of priority from Japanese Patent Application No. 2018-084257 filed before Japanese Patent Office on Apr. 25, 2018. The entire disclosures all of the above applications are incorporated herein by reference.

TECHNICAL FIELD

The present disclosure relates to a technology to improve reliability of automated driving control.

BACKGROUND

In an in-vehicle network, an electronic control unit having a function of calculating manipulated variables concerning automated driving control (hereinafter referred to as main ECU) and a plurality of electronic control units having a function of executing control according to the manipulated variables (hereinafter referred to as ACT system ECUs) may be connected. There is a technology to provide redundancy to a main ECU in the in-vehicle network.

SUMMARY

The present disclosure provides a vehicle control device.

In one example, a vehicle control device comprises a main processing unit, a sub processing unit, a main bus, a sub bus, and a control execution unit. The main processing unit repeatedly generates a main manipulated variable being control data used to control automated driving. The sub processing unit repeatedly generates a sub manipulated variable being control data used to control the automated driving. The main bus is connected to the main processing unit. The sub bus is connected to the sub processing unit. The control execution unit is connected to both the main bus and the sub bus. The control execution unit includes an execution unit and a selection unit. The execution unit executes vehicle control according to a selected manipulated variable, wherein the selected manipulated variable is either the main manipulated variable or the sub manipulated variable. In an initial state, the main manipulated variable is set to the selected manipulated variable. The selection unit switches over the selected manipulated variable from the main manipulated variable to the sub manipulated variable in cases where communication performed via the main bus satisfies a preset switchover condition.

BRIEF DESCRIPTION OF DRAWINGS

FIG. 2 is an explanatory diagram relating to information transmitted and received via a main bus and a sub bus.

DETAILED DESCRIPTION

Figure 1:
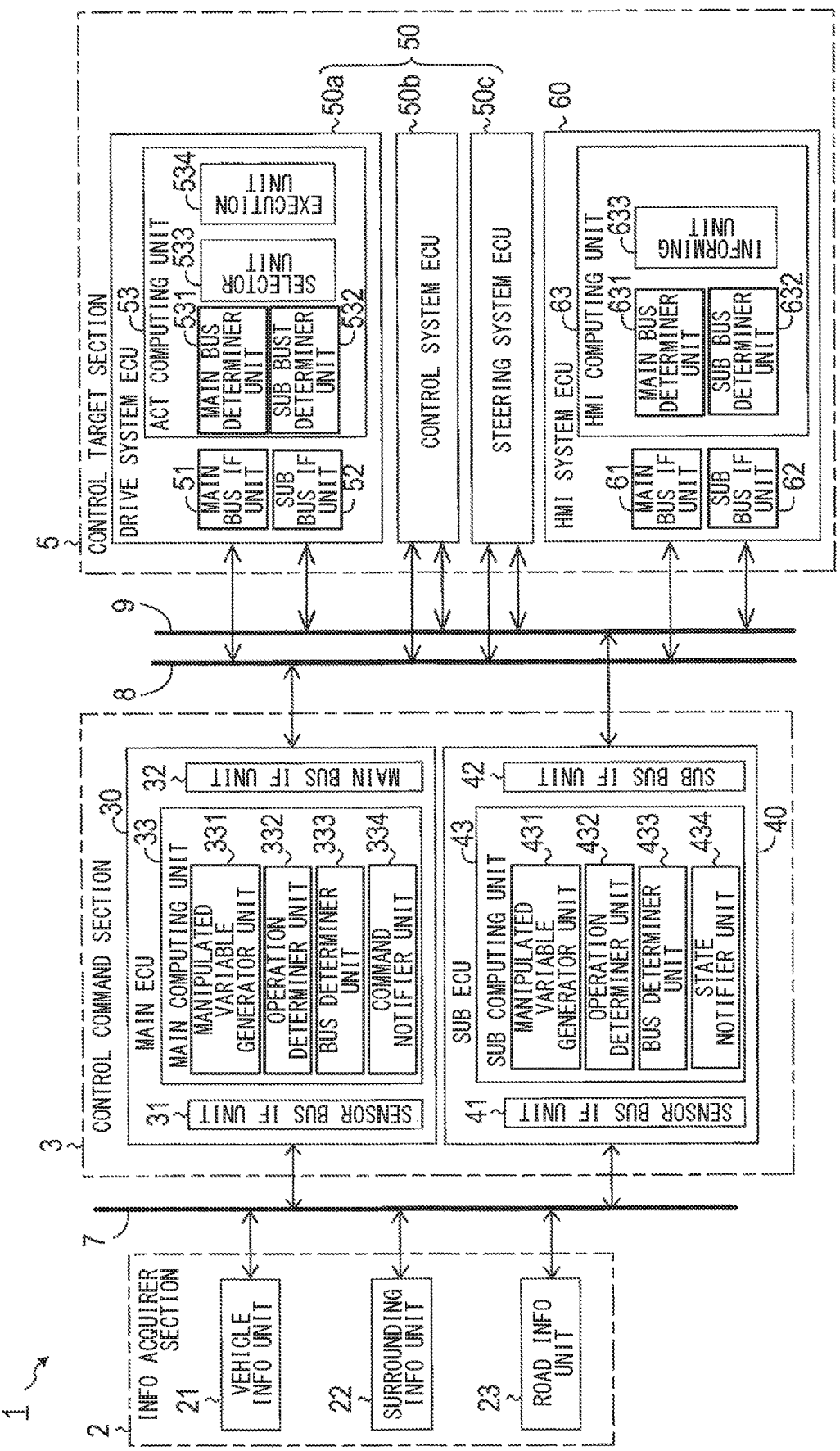
FIG. 1 is a block diagram illustrating a configuration of an automated driving system.

There is a technology to provide redundancy to a main ECU in an in-vehicle network in which an electronic control unit having a function of calculating manipulated variables concerning automated driving control (hereinafter referred to as main ECU) and a plurality of electronic control units having a function of executing control according to the manipulated variables (hereinafter referred to as ACT system ECUs) are connected. Specifically, a sub ECU having a function similar to that of the main ECU is provided, and both the main ECU and the sub ECU not only calculate the manipulated variable but also perform detection for failure, etc., and transmit a failure detection result via a common network. According to the failure detection result received from the main ECU and the sub ECU via the network, the ACT system ECU selects either the manipulated variable generated by the main ECU or the manipulated variable generated by the sub ECU, and performs control for automated driving. Accordingly, even if one of the main ECU and the sub ECU fails, it is possible to continue the automated driving control using the manipulated variable calculated by the other ECU.

However, the present inventor found the following difficulty as a result of detailed study.

Specifically, because the main ECU and the sub ECU are connected to the same network, a conceivable failure is such that the network is occupied by the sub ECU and becomes unusable. In other words, an operation of the sub ECU may affect an operation of the main ECU, and therefore, the design required of the sub ECU is comparable to that of the main ECU. Incidentally, when a safety standard is high, the ECUs are required to have a high failure detection rate of buses and a low failure rate, and many documents are required when designing the ECUs. Further, in case the main ECU fails, the ACT system ECU can continue the automated driving control by acquiring the manipulated variable from the sub ECU. However, in the case of a network failure, the ACT system ECU cannot acquire the manipulated variable from the main ECU nor the sub ECU, so that it is impossible to continue the automated driving control.

One aspect of the present disclosure is to provide a technology that improves reliability of control while reducing a load on designing a redundant system in automated driving control.

A vehicle control device according to an aspect of the present disclosure comprises a main processing unit, a sub processing unit, a main bus, a sub bus, and a plurality of control execution units.

The main processing unit repeatedly generates a main manipulated variable being control data used to control automated driving. The sub processing unit repeatedly generates a sub manipulated variable being control data used to control the automated driving. The main bus is connected to the main processing unit. The sub bus is connected to the sub processing unit. The plurality of control execution units are connected to both the main bus and the sub bus.

The control execution unit includes an execution unit and a selection unit. The execution unit executes vehicle control according to a selected manipulated variable, wherein the selected manipulated variable is either the main manipulated variable or the sub manipulated variable. In an initial state, the main manipulated variable is set to the selected manipulated variable. The selection unit switches over the selected manipulated variable from the main manipulated variable to the sub manipulated variable in cases where communication performed via the main bus satisfies a preset switchover condition.

With such a configuration, because the sub bus connected to the sub processing unit is provided separately from the main bus connected to the main processing unit, an operation of the sub processing unit does not affect an operation of the main processing unit. For this reason, as compared with the main processing unit, it is possible to design the sub processing unit by applying a lower safety standard, and therefore, it is possible to simplify designing of a portion relating to the sub processing unit and the sub bus. Further, because it is possible to continue the automated driving control in case the main bus fails, it is possible to improve reliability of control.

Hereinafter, embodiments of the present disclosure will be described with reference to the drawings.

1. Configuration

<1-1. Overview>

The automated driving system 1 shown in FIG. 1 is mounted to a vehicle and realizes automated driving in which traveling control is automatically performed according to a set route. Below, the vehicle equipped with the automated driving system 1 is referred to as a subject vehicle.

The automated driving system 1 includes an information acquisition section 2, a control command section 3, a control target section 5, a sensor bus 7, a main bus 8, and a sub bus 9.

The information acquisition section 2 acquires a variety of information necessary for automated driving and supplies it to the control command section 3. The information acquisition section 2 includes a vehicle information unit 21, a surrounding information unit 22, and a road information unit 23.

The vehicle information unit 21 collects information from various sensors provided to the subject vehicle and generates vehicle information representing behavior of the subject vehicle. The vehicle information may include position, speed, acceleration, yaw rate, steering angle, etc. of the subject vehicle.

The surrounding information unit 22 generates information on various kinds of objects such as a vehicle present in the vicinity of the subject vehicle, a lane marker, and a road sign, based on images from cameras arranged at front, rear, left and right portions of the subject vehicle and a detection result of a radar sensor. As for the radar sensor, it is possible to use, for example, a millimeter wave radar, a laser radar, an ultrasonic radar, etc.

The road information unit 23 acquires a variety of road information including regulation information on the traveling road, based on at least one of: information acquired using a system that uses vehicle-to-infrastructure such as VICS; and information of a map database in which high-precision maps for automated driving are stored. Note that VICS is an abbreviation for Vehicle Information and Communication System and is a registered trademark. Further, the road information unit 23 may use information recognized from a result of detection by the surrounding information unit 22 concerning a lane marking drawn on the road surface and/or a sign.

The control command section 3 includes a main ECU 30 and a sub ECU 40. Together with the respective units 21 to 23 constituting the information acquisition section 2, both the main ECU 30 and the sub ECU 40 are connected to the sensor bus 7. Further, the main ECU 30 is connected to the main bus 8, and the sub ECU 40 is connected to the sub bus 9. Each of the main ECU 30 and the sub ECU 40 generates manipulated variables of various actuators mounted to the vehicle, based on the information acquired from the information acquisition section 2 and the route information separately generated for automated driving. Hereinafter, the manipulated variable generated by the main ECU 30 will be referred to as a main manipulated variable. Further, the manipulated variable generated by the sub ECU 40 is referred to as a sub manipulated variable.

The control target section 5 includes a plurality of ACT system ECUs 50 and one or more HMI system ECUs 60. ACT is an abbreviation for actuator, and HMI is an abbreviation for human-machine interface. The ACT system ECUs 50 and the HMI system ECU 60 are each connected to both the main bus 8 and the sub bus 9.

An ACT system ECU 50 drives the actuator assigned to this ACT system ECU, according to a manipulated variable of the actuator, wherein the manipulated variable is control data acquired from the control command section 3 via the main bus 8 or the sub bus 9. Kinds of the ACT system ECU 50 includes a drive system ECU 50a, a brake system ECU 50b, and a steering system ECU 50c, etc. The drive system ECU 50a controls at least an actuator relating to an operation of the engine. The brake system ECU 50b controls at least an actuator relating an operation of a brake. The steering system ECU 50c controls at least an actuator relating to an operation of steering. The ACT system ECUs 50 have a similar configuration except that they perform control corresponding to different actuators serving as their control targets.

The HMI system ECU 60 monitors communication states of the main bus 8 and the sub bus 9, and performs the act of informing the driver of the subject vehicle according to the monitoring result.

The main ECU 30 corresponds to a main processing unit, the sub ECU 40 corresponds to a sub processing unit, the ACT system ECU 50 corresponds to a control execution unit, and the HMI system ECU 60 corresponds to an informing execution unit.

<1-2. Main Bus/Sub Bus>

Information transmitted and received via the main bus 8 and the sub bus 9 will be described with reference to FIG. 2

In the main bus 8, the main manipulated variable, a switchover command, and a main bus failure notification are transmitted and received.

The main manipulated variable is transmitted from the main ECU 30 to the ACT system ECUs 50. The main manipulated variable includes manipulated variables required for automated driving control used in respective ACT system ECUs 50.

The switchover command is transmitted from the main ECU 30 toward the ACT system ECU 50 and the HMI system ECU 60. The switchover command is information indicating whether or not it is necessary to switch over the manipulated variable used in the ACT system ECUs 50 from the main manipulated variable to the sub manipulated variable, and specifically, "switchover required" or "switchover unrequired" is indicated in the switchover command.

The main bus failure notification is transmitted from the ACT system ECU 50 toward the main ECU 30. The main bus failure notification is information indicating a result of determination made by the ACT system ECU 50 as to whether or not there is abnormality in the communication state of the main bus 8, specifically, information indicating whether failure of the main bus 8 has been detected; specifically, "presence of failure" or "absence of failure" is indicated in the main bus failure notification.

In the sub bus 9, the sub manipulated variable, a sub system state, and a sub bus failure notification are transmitted and received.

The sub manipulated variable is transmitted from the sub ECU 40 toward the ACT system ECUs 50. The sub manipulated variable includes manipulated variables required for automated driving used in respective ACT system ECUs 50.

The sub system state is transmitted from the sub ECU 40 toward the ACT system ECUs 50 and the HMI system ECU 60. The sub system state is information indicating: a result of the determination made by the sub ECU 40 as to whether or not there is abnormality in an operating state of the sub ECU itself; and the communication state of the sub bus 9, and specifically, "presence of abnormality" or "absence of abnormality" is indicated in the sub system state.

The sub bus failure notification is transmitted from the ACT system ECU 50 toward the sub ECU 40. The sub bus failure notification is information indicating a result of the determination made by the ACT system ECU 50 as to whether or not there is abnormality in the communication state of the sub bus 9, specifically, information indicating whether or not failure of the sub bus 9 has been detected; specifically, "presence of failure" or "absence of failure" is indicated in the sub bus failure notification.

The above-described variety of information transmitted and received via the main bus 8 and the sub bus 9 is added with: transmission order information incremented each time the transmission is performed; and error detection information such as cyclic redundancy check (CRC), etc.

<1-3. ECU>

As shown in FIG. 1, the main ECU 30 includes a sensor bus interface (IF) unit 31, a main bus IF unit 32, and a main computing unit 33. The sub ECU 40 includes a sensor bus IF unit 41, a sub bus IF unit 42, and a sub computing unit 43. The ACT system ECU 50 includes a main bus IF unit 51, a sub bus IF unit 52, and an ACT computing unit 53. The HMI system ECU 60 includes a main bus IF section 61, a sub bus IF unit 62, and an HMI computing unit 63.

The sensor bus IF units 31 and 41 are communication circuits that perform communication via the sensor bus 7. The main bus IF units 32, 51, 61 are communication circuits that perform communication via the main bus 8. The sub bus IF units 42, 52, 62 are communication circuits that perform communication via the sub bus 9.

Each of the main computing unit 33, the sub computing unit 43, the ACT computing unit 53, and the HMI computing unit 63 includes a microcomputer comprising a CPU and a semiconductor memory (hereinafter, memory) such as RAM, ROM, etc. Respective functions implemented by each computing unit 33, 43, 53, 63 are implemented by the CPU executing a program stored in a non-transitory tangible storage medium. In this example, the memory corresponds to a non-transitory tangible storage medium storing a program. Further, by execution of this program, a method corresponding to the program is executed. Each computing unit 33, 43, 53, 63 may include one microcomputer or a plurality of microcomputers.

A manner implementing respective functions executed by each computing unit 33, 43, 53, 63 is not limited to software, and part or all of the functions may be implemented by using one or more hardware. For example, when the above function is implemented by an electronic circuit being hardware, this electronic circuit may be implemented by a digital circuit, an analog circuit, or a combination of these.

2. Processing

<2-1. Main Computing Unit>

As functional blocks, the main computing unit 33 includes a manipulated variable generation unit 331, an operation determination unit 332, a bus determination unit 333, and a command notification unit 334. The operation determination unit 332 and the bus determination unit 333 correspond to a main determination unit.

The manipulated variable generation unit 331 repeatedly generates the main manipulated variable based on the information acquired from the information acquisition section 2 via the sensor bus IF unit 31.

The operation determination unit 332 makes a determination of whether there is abnormality in an operation of the main computing unit 33. Specifically, the presence or absence of abnormality in the CPU may be determined by, for example, checking results of identical operations performed by the CPU, e.g., dual lockstep. The presence or absence of abnormality in the memory may be determined by, for example, error detection that is performed at a time of access to the memory.

The bus determination unit 333 make a determination as to abnormality in the state of communication via the main bus 8.

The command notification unit 334 transmits the main manipulated variable generated by the manipulated variable generation unit 331 via the main bus 8, and also transmits a switchover command according to the determination results of the operation determination unit 332 and the bus determination unit 333.

Now, using the flowcharts of FIG. 3 and FIG. 4, description will be given as to the bus determination process and the notification process, wherein the bus determination process is executed by the main computing unit 33 to implement a function of the bus determination unit 333 and the notification process is executed by the main computing unit 33 to implement a function of the command notification unit 334.

The bus determination process is executed each time the main bus failure notification is received via the main bus 8. Hereinafter, the received bus failure notification will be simply referred to as a receipt notification.

Figure 3:
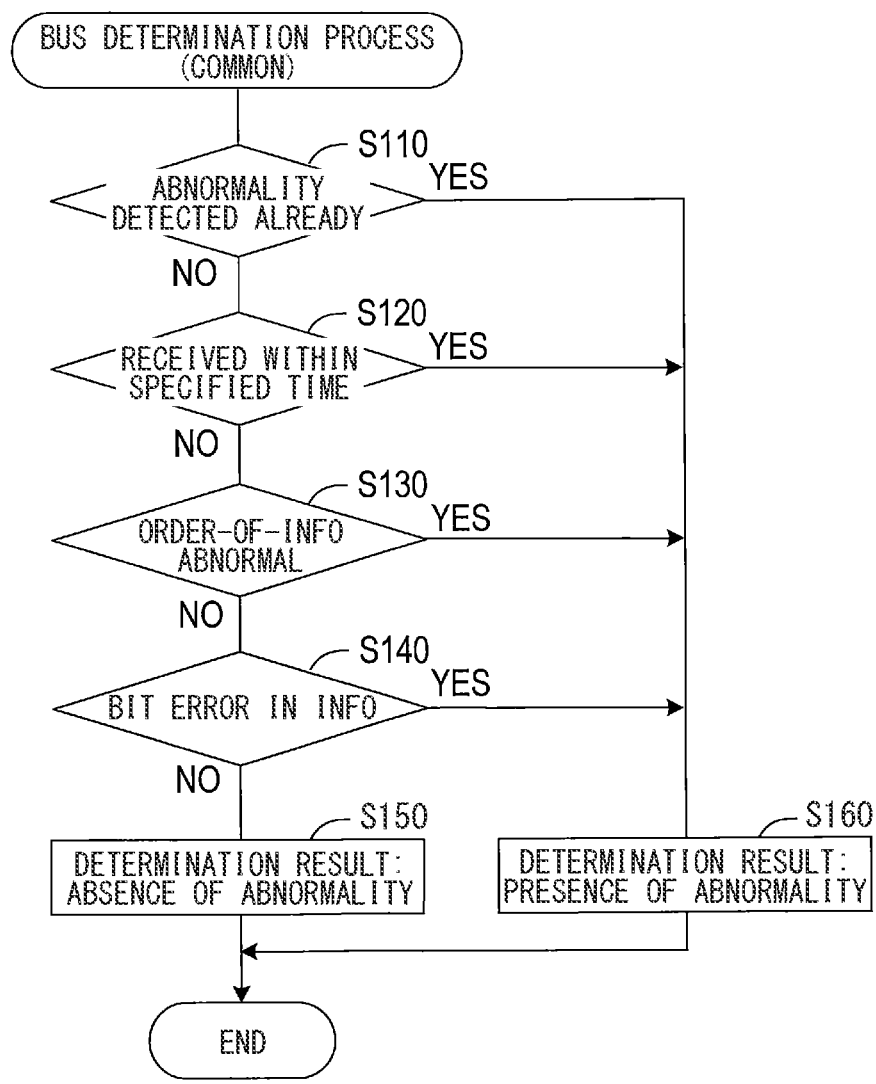
FIG. 3 is a flowchart of a bus determination process in a main ECU and a sub ECU.

As shown in FIG. 3, upon start of the bus determination process, the main computing unit 33 first makes a determination in S110 whether or not the main bus 8 has already been determined to be abnormal. When having already been determined to be abnormal, the main processing unit 33 shift the process to S160; and when not yet determined to be abnormal, the main computing unit 33 shifts the process to S120.

In S120, the main computing unit 33 makes a determination of whether or not an elapsed time from a previous receipt of the receipt notification is within a preset specified time. The specified time is a constant time, and may be set to, for example, about twice an average receipt interval in the case where the receipt notification is normal. When the main computing unit 33 determines that the elapsed time exceeds the specified time, the process proceeds to S160, and when the elapsed time is within the specified time, the process proceeds to S130.

In S130, the main computing unit 33 makes a determination of whether or not there is abnormality in the order information attached to the receipt notification. Specifically, when detecting a change in the order, missing of information, repeated receipt of the same information, etc. by comparing with the order information attached to the previous receipt notification, the presence of abnormality is determined. The determination in this step is performed individually for each sender of the receipt notification. When the main computing unit 33 determines the presence of abnormality in the order information concerning the receipt notification from any of the ECUs belonging to the control target section 5, the process proceeds to S160; and when determining the absence of abnormality in the order information, the process proceeds to S140.

In S140, the main computing unit 33 makes a determination of whether or not there is a bit error in the receipt notification. Specifically, the presence or absence of a bit error is determined using the error detection information attached to the receipt notification. When the main computing unit 33 determines that the receipt notification has a bit error, the processing proceeds to S160 and when determining that the receipt notification has no bit error, the process proceeds to S150.

In S150, the main computing unit 33 determines that there is no abnormality in the communication state of the main bus 8, and the process is ended.

In S160, the main computing unit 33 determines that there is abnormality in the communication state of the main bus 8, and the process is ended.

The result of the determination of whether or not there is abnormality in the communication state of the main bus 8 is stored in, for example, the memory included in the main computing unit 33.

In addition, the notification process is repeatedly executed at preset constant periods. The constant period may be, for example, set to match a transmission period of the main manipulated variable.

Figure 4:
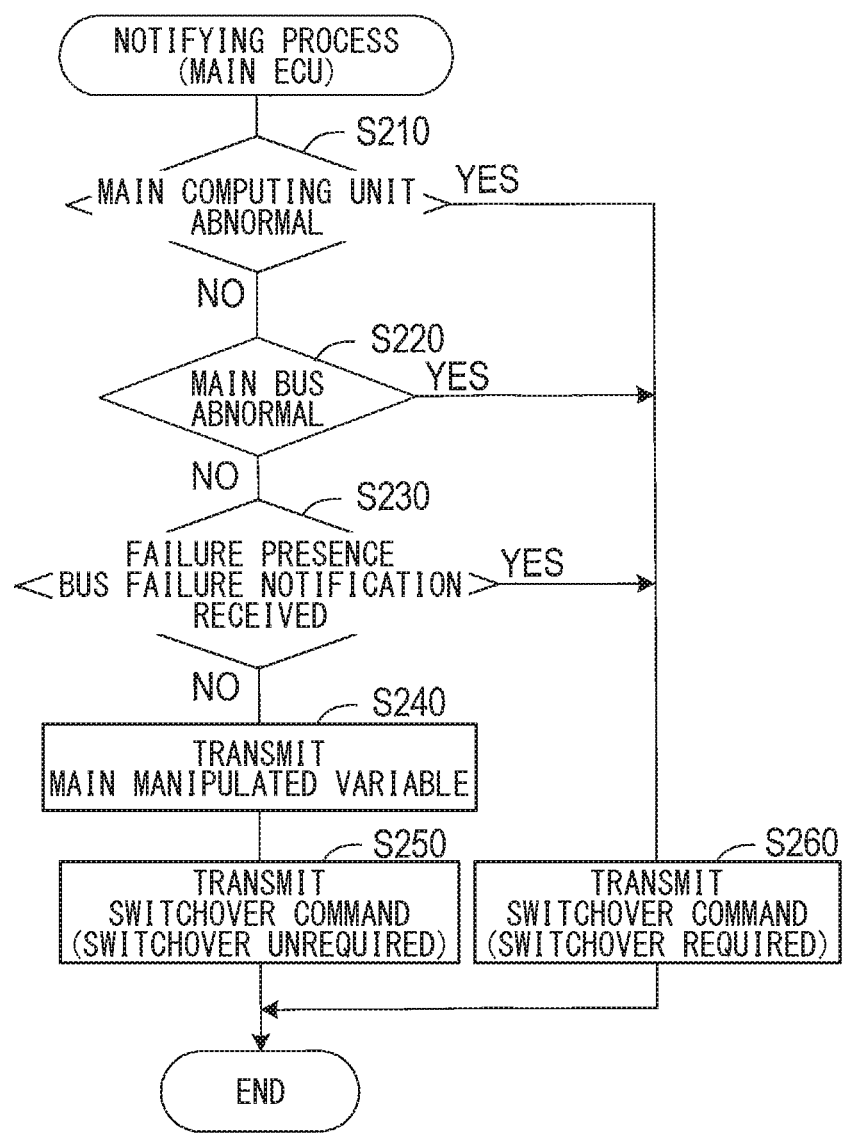
FIG. 4 is a flowchart of a notification process in a main ECU.

As shown in FIG. 4, upon start of the notification process, the main computing unit 33 first makes a determination in S210 whether or not a result of the determination made by the operation determination unit 332 is the presence of abnormality. The main computing unit 33 shifts the process to S260 when the determination result is the presence of abnormality, and shifts the process to S220 when the determination result is the absence of abnormality.

In S220, the main computing unit 33 makes a determination of whether a result of the determination made by the bus determination unit 333 is the presence of abnormality. The main computing unit 33 shifts the process to S260 when the determination result is the presence of abnormality, and shifts the process to S230 when the determination result is the absence of abnormality.

In S230, the main computing unit 33 makes a determination of whether or not a bus failure notification indicative of "the presence of failure" (hereinafter, failure presence notification) has been received via the main bus 8. When the failure presence notification has been received, the main computing unit 33 shifts the process to S260, and when the failure presence notification has not been received, the process proceeds to S240.

In S240, via the main bus 8, the main computing unit 33 transmits the main manipulated variable being the manipulated variable generated by the manipulated variable generation unit 331.

In the subsequent S250, the main computing unit 33 transmits the switchover command indicative of "switchover unrequired" via the main bus 8 and the process is ended.

In S260, the main computing unit 33 transmits the switchover command notification indicative of "switchover required" via the main bus 8 and the process is ended.

The conditions for causing the determinations in S210 to S230 to result in affirmative determinations correspond to command conditions.

<2-2. Sub Computing Unit>

As shown in FIG. 1, as functional blocks, the sub computing unit 43 includes a manipulated variable generation unit 431, an operation determination unit 432, a bus determination unit 433, and a state notification unit 434. The operation determination unit 432 and the bus determination unit 433 correspond to a sub determination unit.

The manipulated variable generation unit 431 repeatedly generates the sub manipulated variable based on the information acquired from the information acquisition section 2 via the sensor bus IF unit 41. The sub manipulated variable may be generated in a similar manner as the main manipulated variable, or may be generated in a manner different than the main manipulated variable. For example, the sub manipulated variable may be generated in a simplified manner requiring less computing, or may generated by reducing the number of significant digits of precision.

The operation determination unit 432 makes a determination of whether or not there is abnormality in an operation of the sub computing unit 43. Specifically, a manner similar to that of the operation determination unit 332 of the main computing unit 33 may be used.

The bus determination unit 433 makes a determination as to abnormality in the state of communication via the sub bus 9. A specific manner of the determination used may be similar to that of the bus determination unit 333 of the main computing unit 33. Specifically, contents of the bus determination process executed by the sub computing unit 43 to implement a function of the bus determination unit 433 are similar to those of the bus determination process executed by the main computing unit 33. In this regard however, in the above description of S110 to S160, it is assumed that the main computing unit 33 is replaced with the sub computing unit 43, the main bus 8 is replaced with the sub bus 9, and the main bus failure notification is replaced with the sub bus failure notification.

The state notification unit 434 transmits the sub manipulated variable generated by the manipulated variable generation unit 431, and also transmits the sub state according to the determination result of the operation determination unit 432 and the determination result of the bus determination unit 433.

Figure 5:
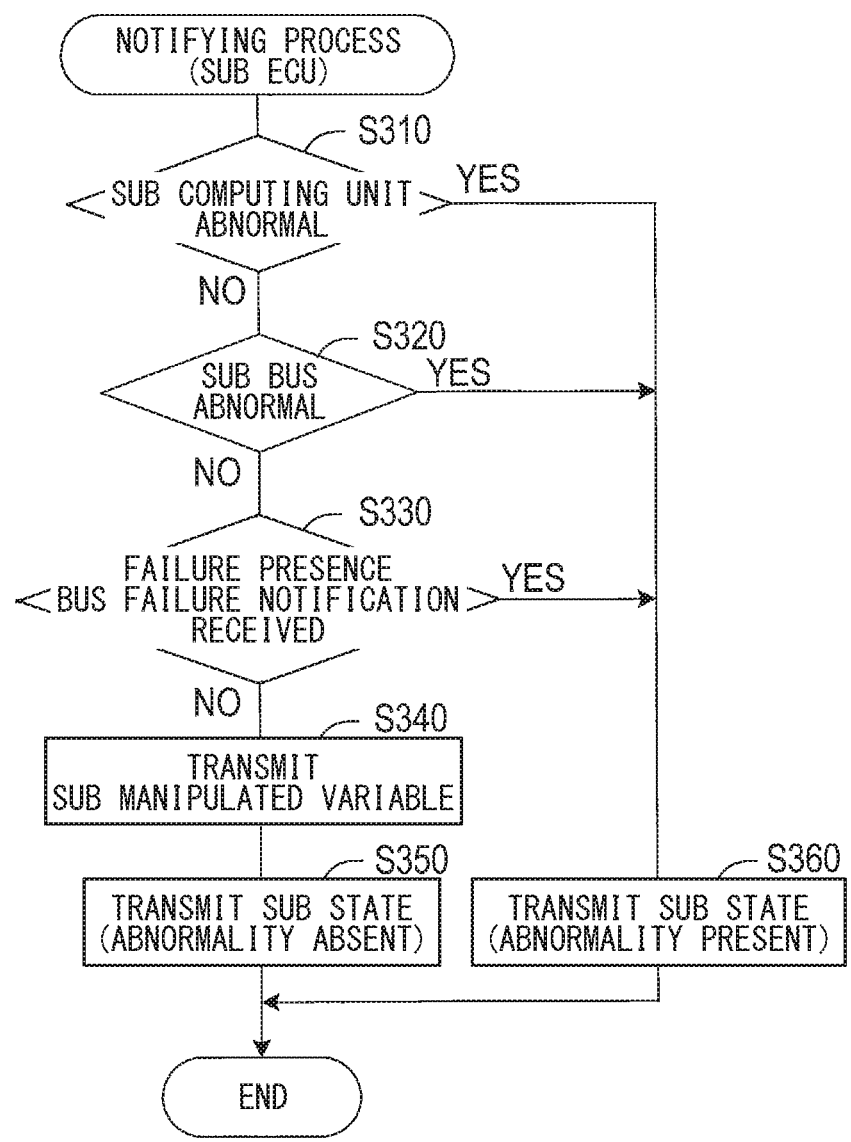
FIG. 5 is a flowchart of a notification process in a sub ECU.

Now, the notification process executed by the sub computing unit 43 to implement a function of the state notification unit 434 will be described using the flowchart of FIG. 5.

The notification process is repeatedly executed at preset constant periods. The constant period may be, for example, set to match a transmission period of the sub manipulated variable.

Upon start of the notification process, the sub computing unit 43 makes a determination in S310 whether or not a result of the determination made by the operation determination unit 432 is the presence of abnormality. In S320, it is determined whether a result of the determination made by the bus determination unit 433 is the presence of abnormality. In S330, it is determined whether or not the sub bus failure notification indicative of the presence of failure (hereinafter, failure presence notification) has been received via the sub bus 9.

When the sub computing unit 43 determines the presence of abnormality in S310 or S320, or when the sub computing unit 43 determines in S330 that the failure presence notification has been received, the process proceeds to S360; otherwise, the process proceeds to S340.

In S340, via the sub bus 9, the sub computing unit 43 transmits the sub manipulated variable being the manipulated variable generated by the manipulated variable generation unit 431.

In subsequent S350, the sub computing unit 43 transmits the sub state indicative of "the absence of abnormality" via the sub bus 9, and the process is ended.

In S360, the sub computing unit 43 transmits the sub state indicative of "the presence of abnormality" via the sub bus 9, and the process is ended.

<2-3. ACT Computing Unit>

As functional blocks, the ACT computing unit 53 includes a main bus determination unit 531, a sub bus determination unit 532, a selection unit 533, and an execution unit 534.

The main bus determination unit 531 is configured similarly to the bus determination unit 333 of the main ECU 30, and the sub bus determination unit 532 is configured similarly to the bus determination unit 433 of the sub ECU 40.

According to the determination results of the main bus determination unit 531 and the sub bus determination unit 532, etc., the selection unit 533 transmits the bus failure notification and also selects either the main manipulated variable or the sub manipulated variable as the selected manipulated variable and supplies the selected variable to the unit 534. In an initial state such as at the time of shipping, after repair, etc., the main manipulated variable is selected as the selected manipulated variable.

The execution unit 534 executes control of the actuator, etc., according to the selected manipulated variable supplied from the selection unit 533.

Figure 6:
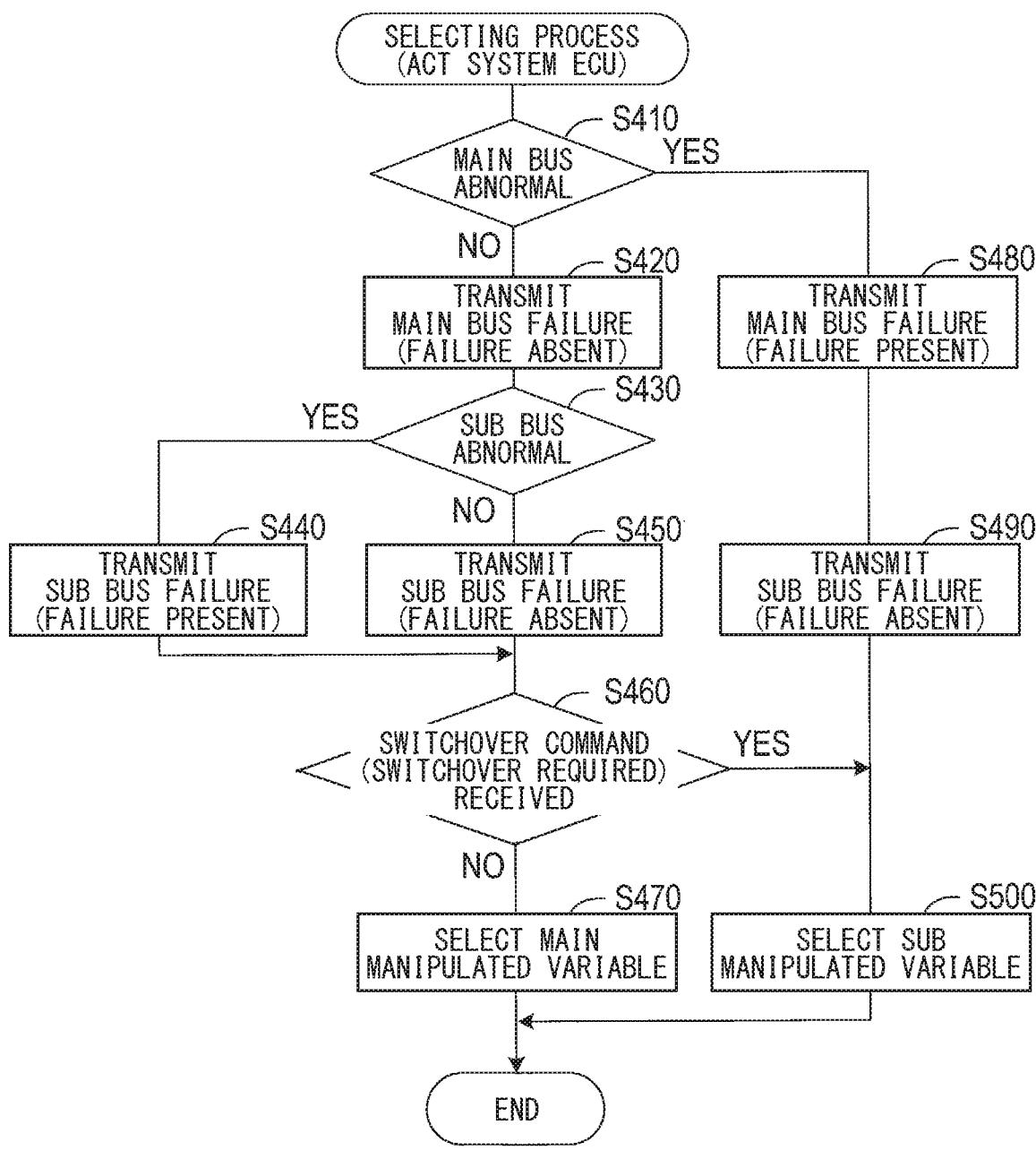
FIG. 6 is a flowchart of a selection process in an ACT system ECU.

Now, the selection process executed by the ACT computing unit 53 to implement a function of the selection unit 533 will be described using the flowchart of FIG. 6.

The selection process is repeatedly executed at preset constant periods.

Upon start of the selection process, the ACT computing unit 53 makes a determination in S410 whether or not a result of the determination made by the main bus determination unit 531 is the presence of abnormality. When the determination result is the presence of abnormality, the ACT computing unit 53 shifts the process to S480, and when the determination result is the absence of abnormality, and the ACT computing unit 53 shifts the process to S420.

In S420, the ACT computing unit 53 transmits the main bus failure notification indicative of "the absence of failure" via the main bus 8.

In subsequent S430, the ACT computing unit 53 makes a determination of whether or not a result of the determination made by the sub bus determination unit 532 is the presence of abnormality. When the determination result is the presence of abnormality, the ACT computing unit 53 shifts the process to S440; and when the determination result is the absence of abnormality, the ACT computing unit 53 shifts the process to S450.

In S440, the ACT computing unit 53 transmits the sub bus failure notification indicative of "the presence of failure" via the sub bus 9, and advances the process to S460.

In S450, the ACT computing unit 53 transmits the sub bus failure notification indicative of "the absence of failure" via the sub bus 9, and advances the process to S460.

In S460, the ACT computing unit 53 makes a determination of whether or not the switchover command indicative of "switchover required" (hereinafter, switchover-required command) has been received via the main bus 8. The ACT computing unit 53 shifts the process to S500 when the switching-required command has been received, and shifts the process to S470 when the switchover-required command has not been received.

In S470, the ACT computing unit 53 selects the main manipulated variable as the manipulated variable to be supplied to the execution unit 534, and the process is ended.

In S480, the ACT computing unit 53 transmits the main bus failure notification indicative of "the presence of failure" via the main bus 8.

In subsequent S490, the ACT computing unit 53 transmits the sub bus failure notification indicative of "the absence of failure" via the sub bus 9, and advances the process to S500.

In S500, the ACT computing unit 53 selects the sub manipulated variable as the manipulated variable to be supplied to the execution unit 534, and the process is ended.

It is noted that conditions for causing respective determinations in S110 to S140 associated with S410 and S470 to result in affirmative determinations correspond to switchover conditions. Further, S420 and S480 correspond to a main failure notification unit, and S430 to S450 and S490 correspond to a sub failure notification unit.

<2-4. HMI Computing Unit>

As functional blocks, the HMI computing unit 63 includes a main bus determination unit 631, a sub bus determination unit 632, and an informing unit 633.

The main bus determination unit 631 is configured similarly to the bus determination unit 333 of the main ECU 30, and the sub bus determination unit 632 is configured similarly to the bus determination unit 433 of the sub ECU 40.

The informing unit 633 executes informing to the driver of the subject vehicle according to the determination results of the main bus determination unit 631 and the sub bus determination unit 632, etc.

Figure 7:
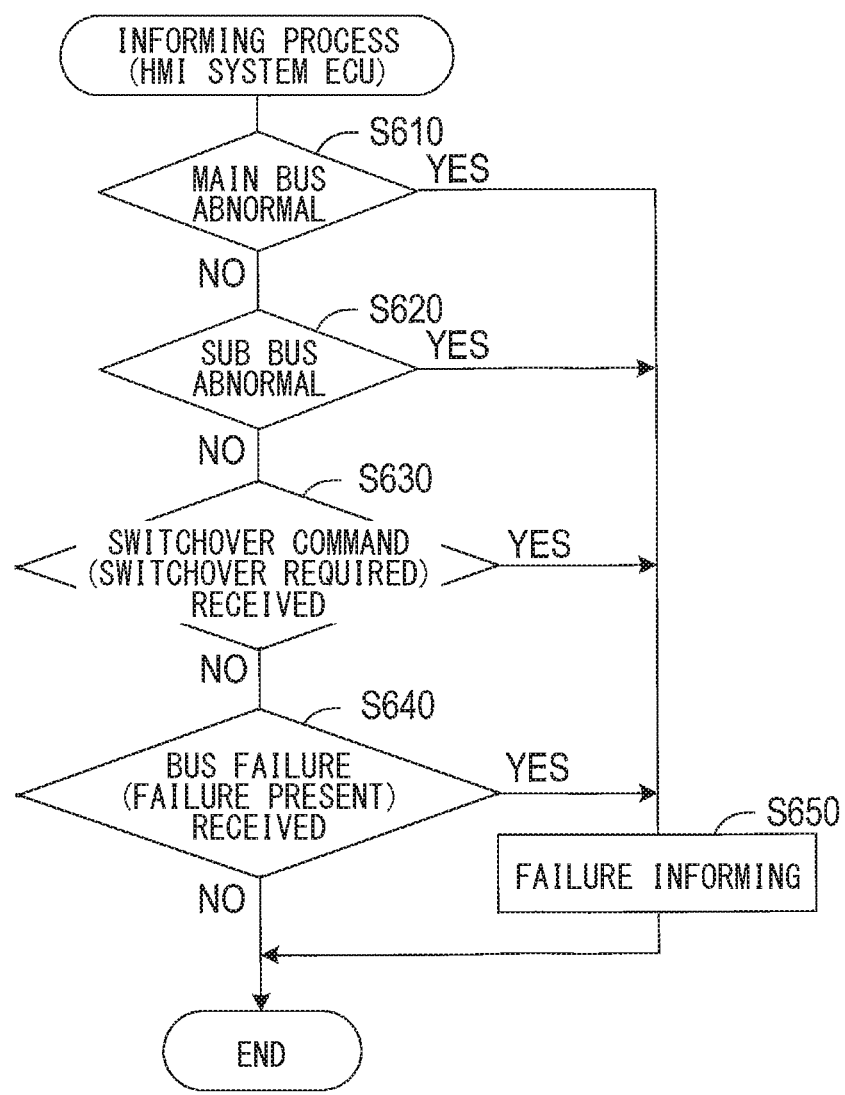
FIG. 7 is a flowchart of an informing process in an HMI system ECU.

Now, the informing process executed by the HMI computing unit 63 to implement a function of the informing unit 633 will be described using the flowchart of FIG. 7.

The informing process is repeatedly executed at preset constant periods.

Upon start of the informing process, the HMI computing unit 63 makes a determination in S610 whether a result of the determination made by the main bus determination unit 631 is the presence of abnormality. The HMI computing unit 63 shifts the process to S650 when the determination result is the presence of abnormality, and shifts the process to S620 when the determination result is the absence of abnormality.

In S620, the HMI computing unit 63 makes a determination of whether or not a result of the determination made by the sub bus determination unit 632 is the presence of abnormality. The HMI computing unit 63 shifts the process to S650 when the determination result is the presence of abnormality, and shifts the process to S630 when the determination result is the absence of abnormality.

In S630, the HMI computing unit 63 makes a determination of whether or not the switchover command indicative of "switchover required" (specifically, the switchover-required command) has been received via the main bus 8. The HMI computing unit 63 shifts the process to S650 when the switchover-required command has been received, and shifts the process to S640 when the switchover-required command has not been received.

In S640, the HMI computing unit 63 makes a determination of whether or not the main bus failure notification or sub bus failure notification indicative of "the presence of failure" (hereinafter, failure presence notification) has been received via the main bus 8 or sub bus 9. The HMI computing unit 63 shifts the process to S650 when having received any of the failure presence notifications, and ends the process when having received none of the failure presence notifications.

In step S650, the HMI computing unit 63 perform informing to the driver according to form of the detected abnormality and ends the process.

Specifically, as the informing to the driver, the informing indicative of abnormality place as well as occurrence of abnormality may be performed for example. Alternatively, the informing that urges the driver to change over from automated driving to manual driving may be performed.

3. Operation Example

A representative operation example of the automated driving system 1 will be described using FIGS. 8 to 16.

Basically, the main ECU 30 repeatedly transmits the main manipulated variable and the switchover command via the main bus 8, and the sub ECU 40 repeatedly transmits the sub manipulated variable and the sub state via the sub bus 9. Further, the ACT system ECU 50 transmits the main bus failure notification via the main bus 8 each time the main manipulated variable is received, and transmits the sub bus failure notification via the sub bus 9 each time the sub manipulated variable is received.

From FIGS. 8 to 16, the switchover command indicative of "switchover unrequired" and the main bus failure notification and sub bus failure notification indicative of "the absence of failure" are omitted. In the following description, the switchover command indicative of "switchover required" is simply referred to as a switchover command, and the main bus failure notification and sub bus failure notification indicative of "the presence of failure" are simply referred to as main bus failure notification and sub bus failure notification.

Figure 8:
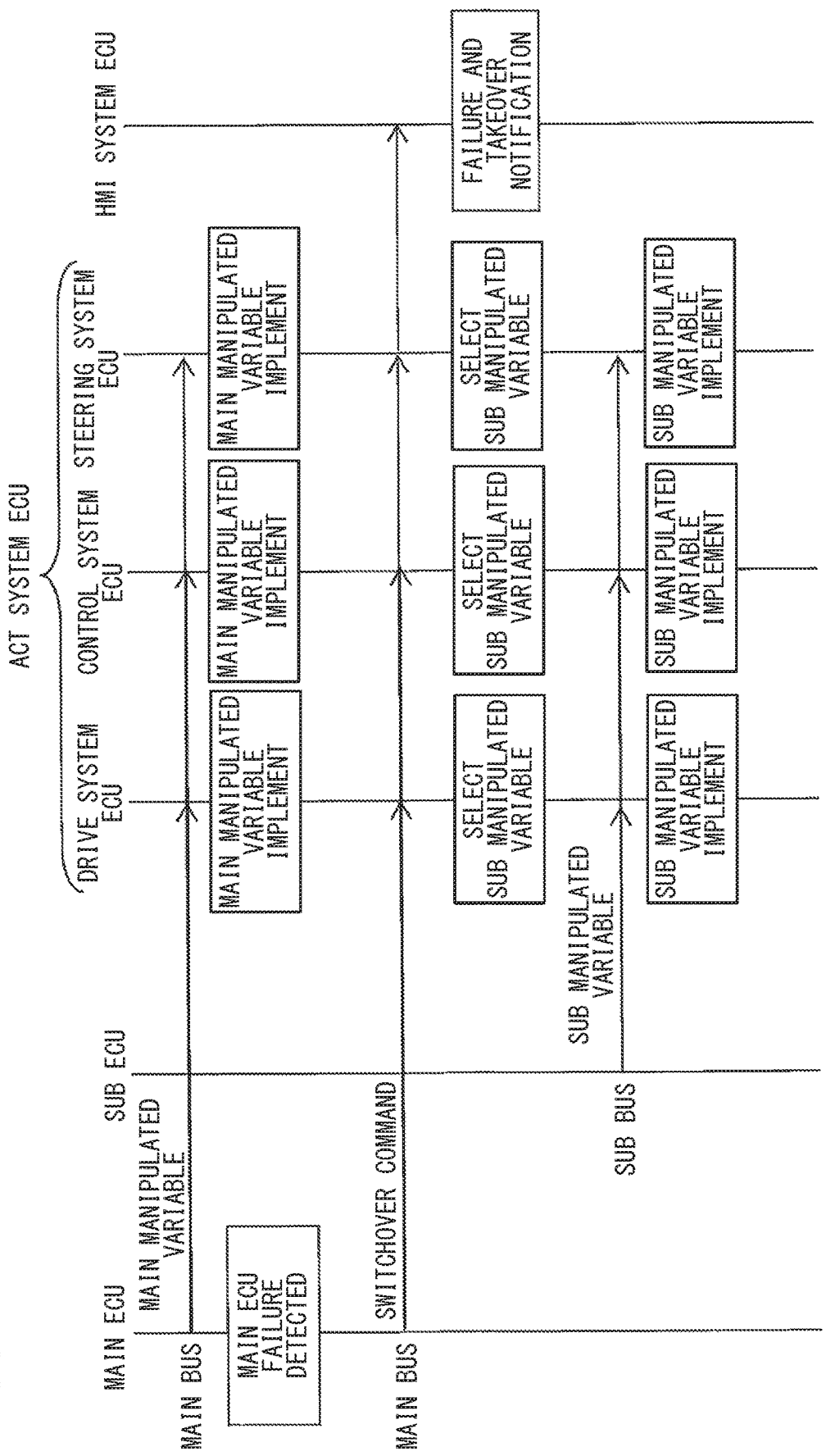
FIG. 8 is an explanatory diagram illustrating an operation for cases where abnormality is detected by a main ECU.

FIG. 8 illustrates an operation for cases where abnormality in the operation of the main computing unit 33 is detected by the main ECU 30.

Before the abnormality is detected by the main ECU 30, the ACT system ECU 50 executes control according to the main manipulated variable acquired via the main bus 8. When the abnormality is detected by the main ECU 30, the main ECU 30 transmits the switchover command via the main bus 8.

Upon receipt of the switchover command, the ACT system ECU 50 performs sub manipulated variable selection to switch over the selected manipulated variable from the main manipulated variable to the sub manipulated variable. Thereafter, all the ACT system ECUs 50 execute the control according to the sub manipulated variables acquired via the sub bus 9. In addition, the HMI system ECU 50 having received the switchover command executes informing to the driver.

Figure 9:
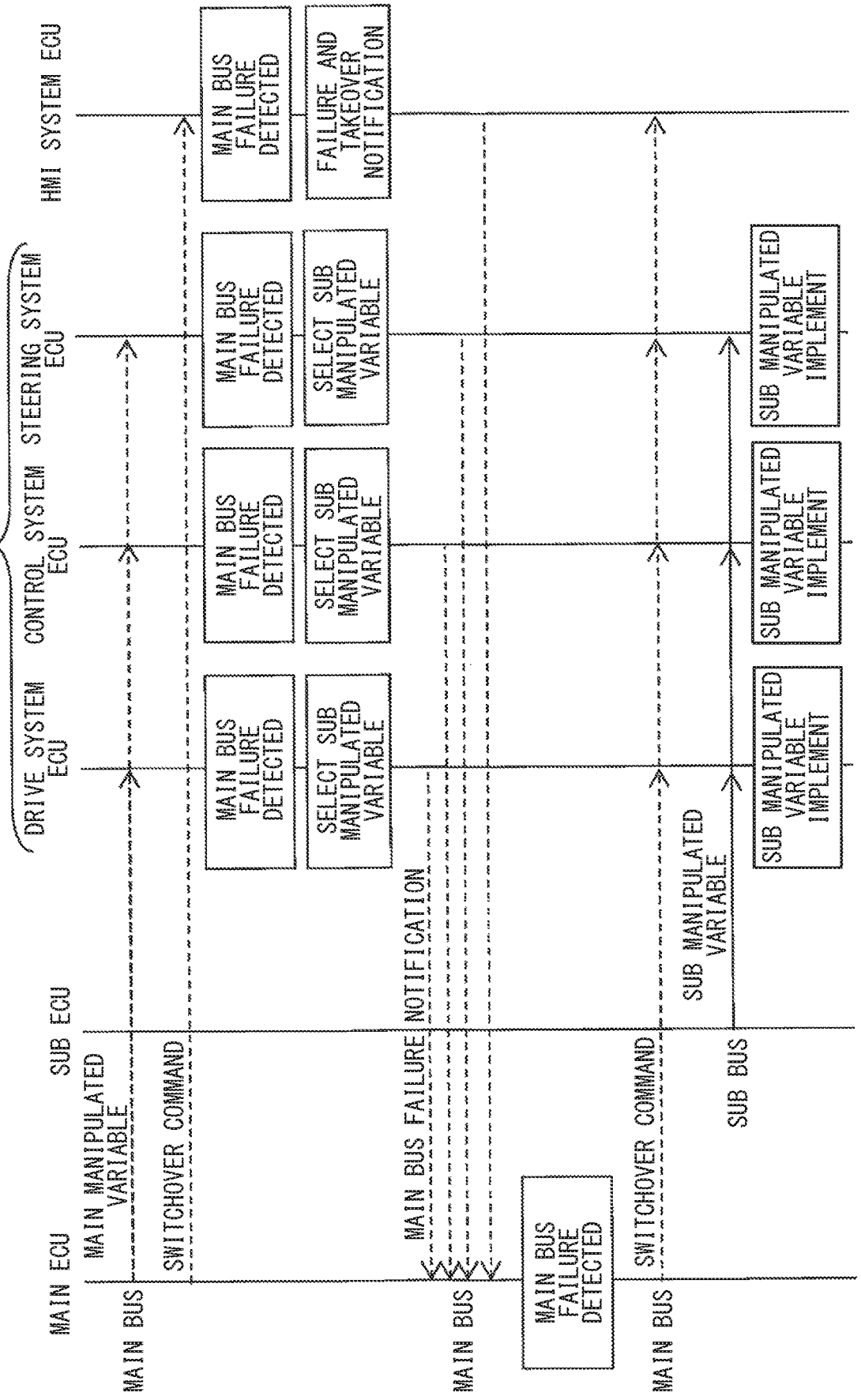
FIG. 9 is an explanatory diagram illustrating an operation for cases where a main bus fails and for cases where a main ECU cannot perform transmission and receipt via the main bus.

FIG. 9 illustrates an operation for cases where the communication via the main bus 8 becomes unperformable due to the failure of the main bus 8 or for cases where although the main bus 8 is normal, the main ECU 30 becomes unable to perform transmission and receipt via the main bus 8.

At a time when the receipt via the main bus 8 is stopped for a specified time or longer, all of the ACT system ECUs 50 and the HMI system ECU 60 each determine that the communication state of the main bus 8 is abnormal. Specifically, the failure of the main bus 8 is detected by all the ACT system ECUs 50 and the HMI system ECU 60. In this case, the HMI system ECU 60 executes the informing to the driver. All the ACT system ECUs 50 then performs the control according to the sub manipulated variable acquired via the sub bus 9, by performing the sub manipulated variable selection. Further, all the ACT system ECUs 50 transmit the main bus failure notifications via the main bus 8, respectively. In this case, the main ECU 30 cannot normally receive these notifications.

The main ECU 30 determines that the communication state of the main bus 8 is abnormal, in response to the receipt via the main bus 8 being stopped for a predetermined time or longer. Specifically, the main ECU 30 also detects the failure of the main bus 8, and the main ECU 30 transmits the switchover command via the main bus 8. However, in this case, all the ACT system ECU 50 and the HMI system ECU 60 cannot normally receive the switchover command.

Figure 10:
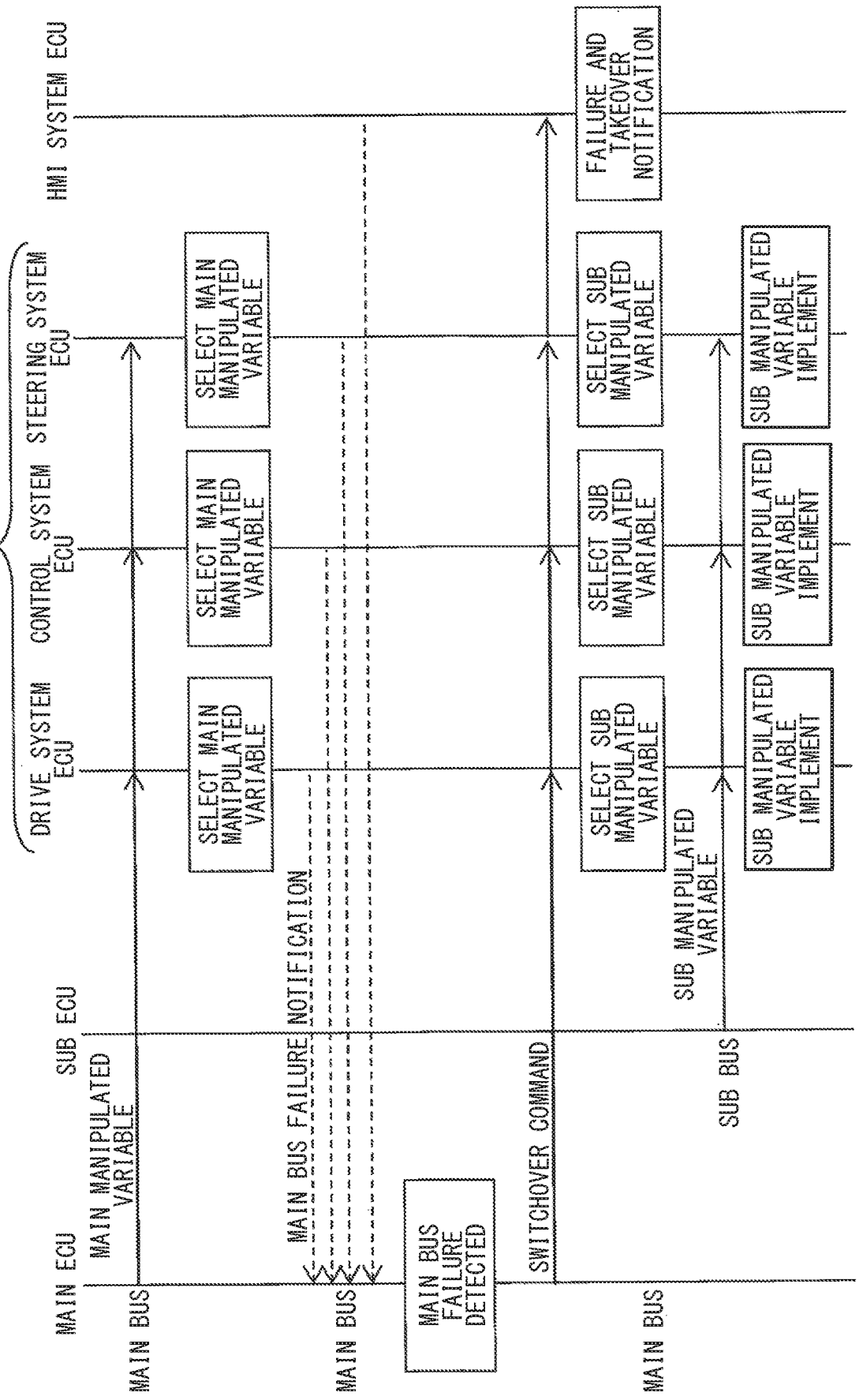
FIG. 10 is an explanatory diagram illustrating an operation for cases where a main ECU cannot perform receipt via a main bus.

FIG. 10 illustrates an operation for cases where although the main bus 8 is normal, the main ECU 30 cannot perform the receipt via the main bus 8.

Because all of the ACT system ECUs 50 can normally perform receipt via the main bus 8, each ACT system ECU 50 repeatedly transmits the main bus failure notification indicative of "the absence of failure". In this case, the main ECU 30 cannot normally receive these notifications.

In response to the receipt being stopped for a specified time or longer, the main ECU 30 determines that the communication state of the main bus 8 is abnormal, and transmits the switchover command via the main bus 8.

In response to receipt of the switchover command, all the ACT system ECUs 50 and the HMI system ECUs 60 execute the sub manipulated variable selection and the informing to the driver. Thereafter, all the ACT system ECUs 50 execute control according to the sub manipulated variables acquired via the sub bus 9.

Figure 11:
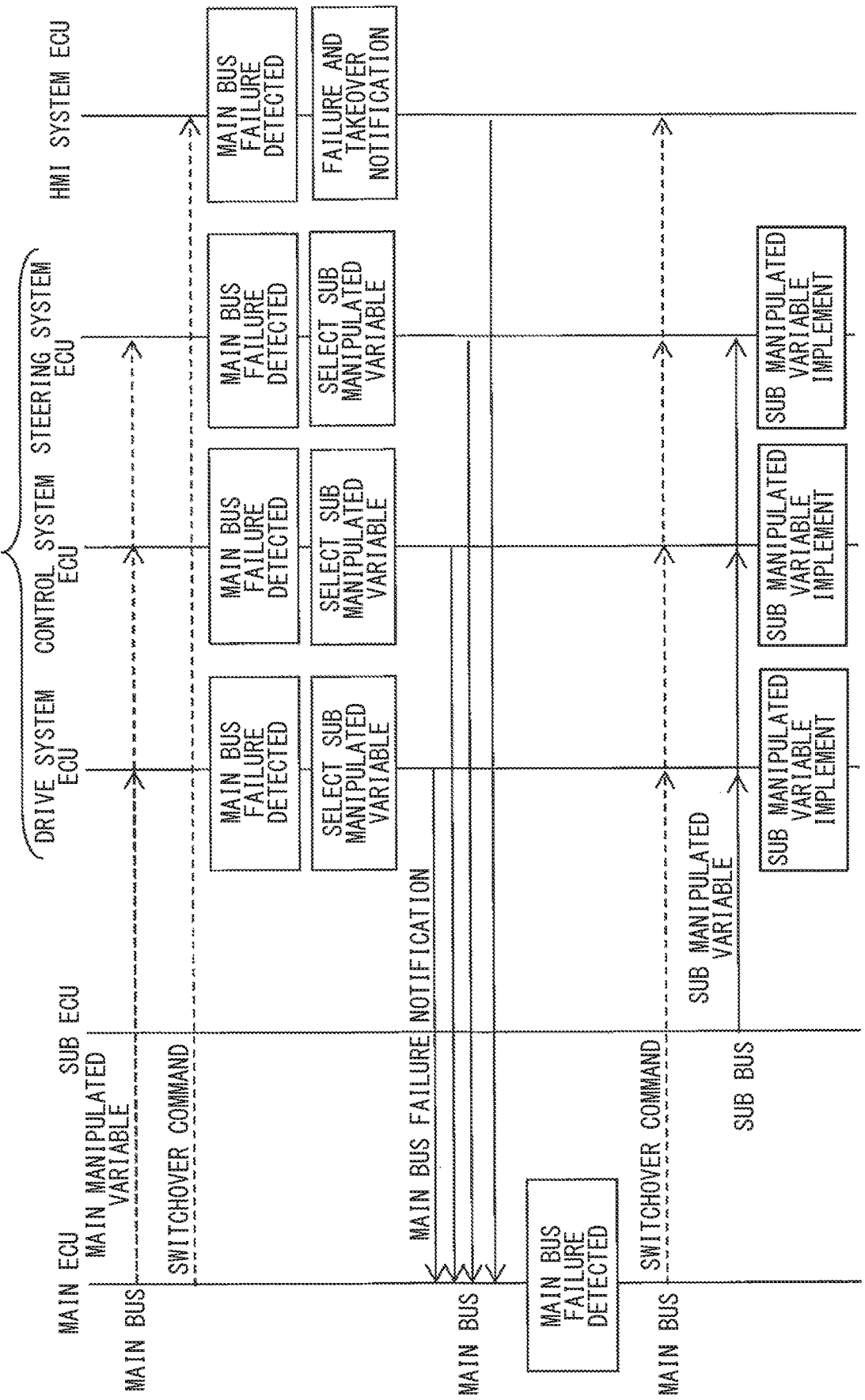
FIG. 11 is an explanatory diagram illustrating an operation for cases where the main ECU cannot perform transmission via a main bus.

FIG. 11 illustrates an operation for cases where although the main bus 8 is normal, the main ECU 30 cannot perform transmission via the main bus 8.

At a time when the receipt via the main bus 8 is stopped for a specified time or longer, all the ACT system ECUs 50 and the HMI system ECU 60 determine that the communication state of the main bus 8 is abnormal, and perform the sub manipulated variable selection and the informing to the driver. Thereafter, all the ACT system ECUs 50 execute control according to the sub manipulated variables acquired via the sub bus 9. Further, all the ACT system ECUs 50 transmit the main bus failure notifications via the main bus 8, respectively.

Upon receipt of the main bus failure notification, the main ECU 30 determines that the communication state of the main bus 8 is abnormal, and transmits the switchover command via the main bus 8. However, in this case, all of the ACT type EUC 50 and the HMI type ECU 60 cannot normally receive the switchover command.

Figure 12:
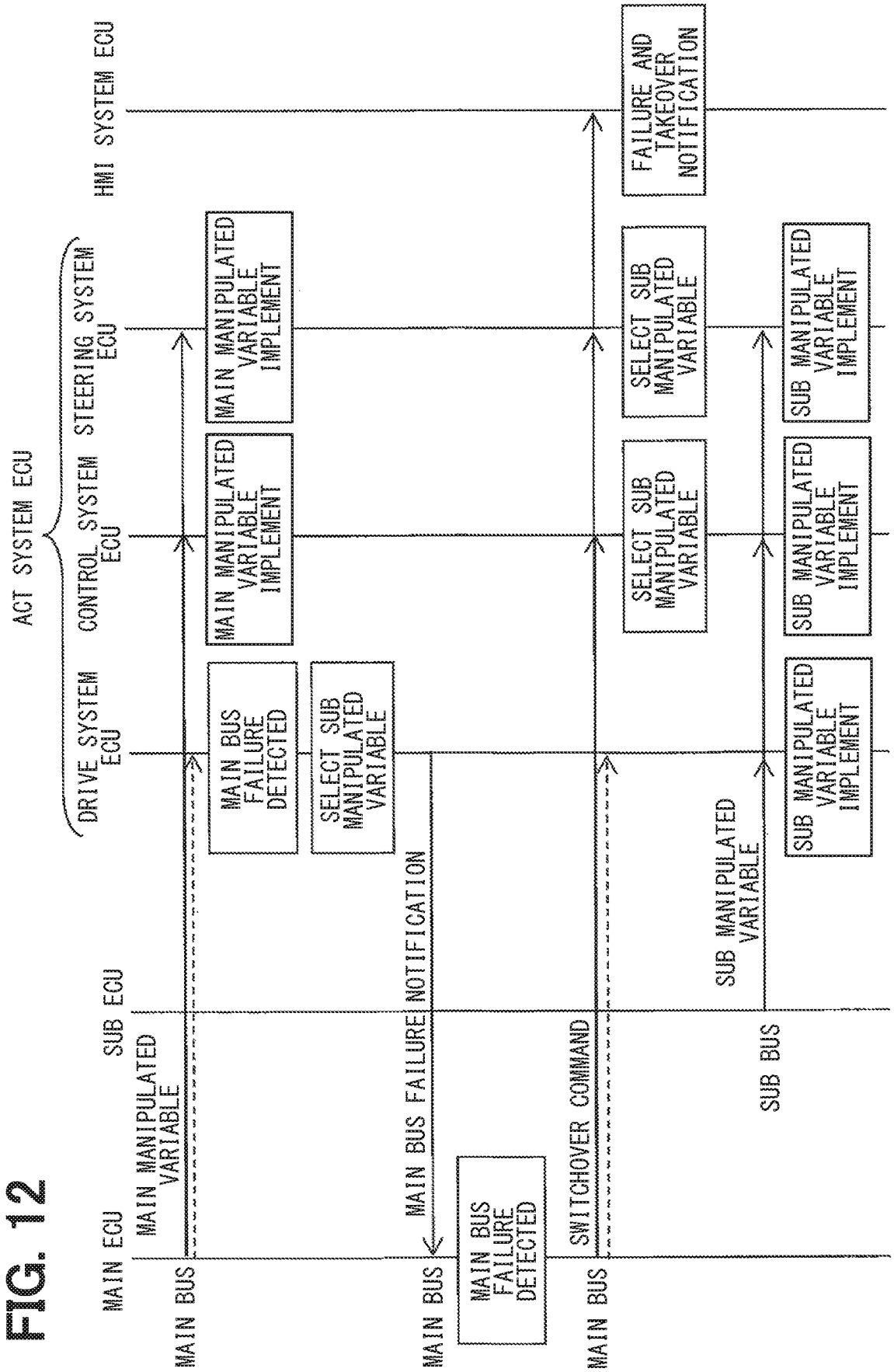
FIG. 12 is an explanatory diagram illustrating an operation for cases where one of ACT system ECUs cannot perform receipt via a main bus.

FIG. 12 illustrates an operation for cases where although the main bus 8 is normal, the drive system ECU 50*a* being one of the ACT system ECUs 50 becomes unable to perform receipt via the main bus 8.

In response to the receipt being stopped for a specified time or longer, the drive system ECU 50*a* determines that the communication state of the main bus 8 is abnormal, and performs the sub manipulated variable selection and transmits the main bus failure notification via the main bus 8.

Upon receipt of the main bus failure notification, the main ECU 30 determines that the communication state of the main bus 8 is abnormal, and transmits the switchover command via the main bus 8.

By receiving the switchover command, the HMI system ECU 60 and the ACT system ECUs 50 other than the drive system ECU 50*a* execute the sub manipulated variable selection and the informing to the driver. Thereafter, all the ACT system ECUs 50 execute control according to the sub manipulated variables acquired via the sub bus 9.

Figure 13:
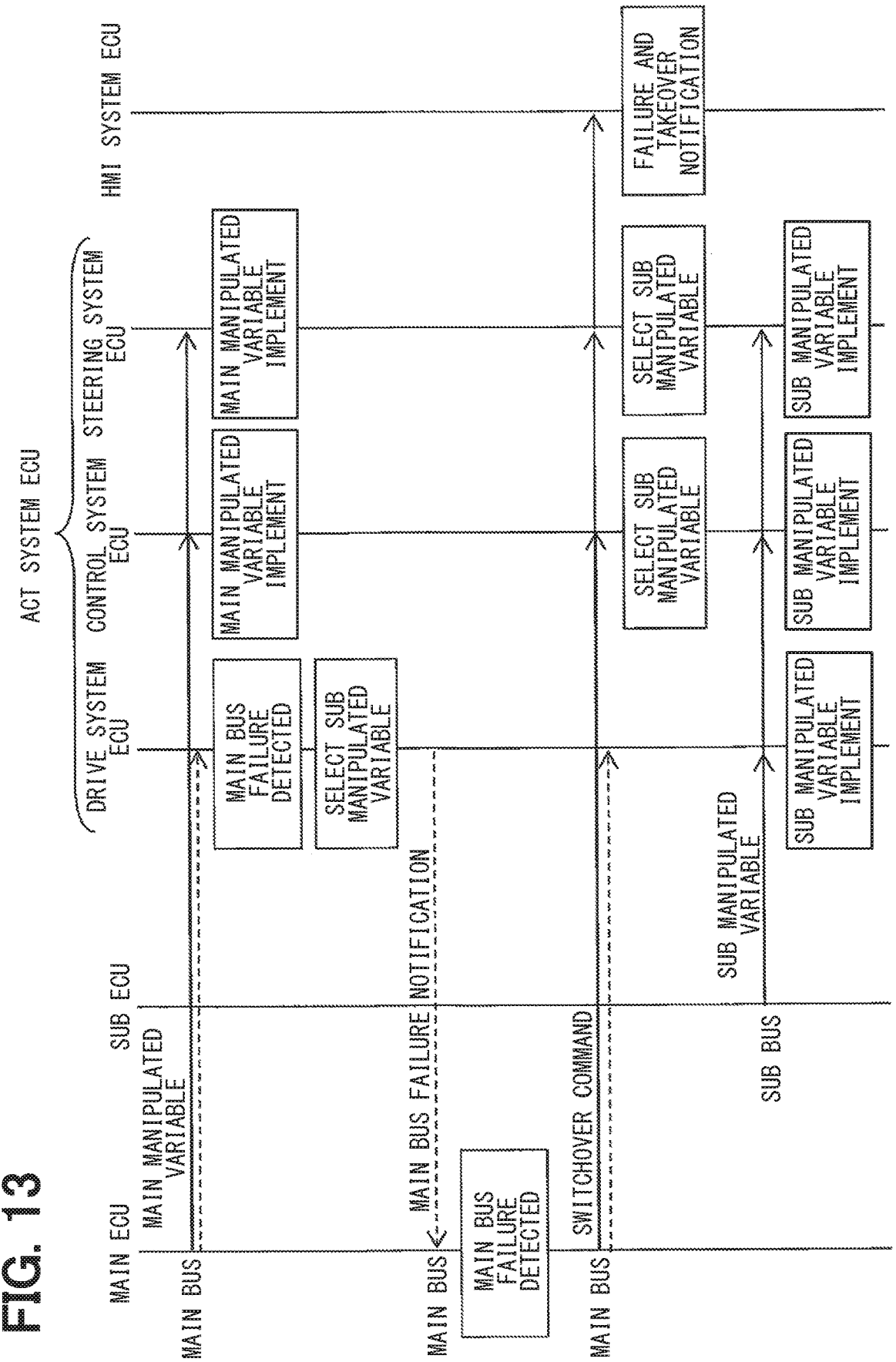
FIG. 13 is an explanatory diagram illustrating an operation for cases where one of ACT system ECUs cannot perform transmission and receipt via a main bus.

FIG. 13 illustrates an operation for cases where although the main bus 8 is normal, the drive system ECU 50*a* being one of the ACT system ECUs 50 becomes unable to perform transmission and receipt via the main bus 8.

In response to the receipt being stopped for the specified time or longer, the drive system ECU 50*a* determines that the communication state of the main bus 8 is abnormal, and performs the sub manipulated variable selection and transmits the main bus failure notification via the main bus 8. However, in this case, the main ECU 30 cannot normally receive the main bus failure notification.

In response to the receipt from the drive system ECU 50*a* being stopped for the specified time or longer, the main ECU 30 determines that the communication state of the main bus 8 is abnormal, and transmits the switchover command via the main bus 8.

Upon receipt of the switchover command, the HMI system ECU 60 and the ACT system ECUs 50 other than the drive system ECU 50*a* execute the sub manipulated variable selection and the informing to the driver. Thereafter, all the ACT system ECUs 50 execute control according to the sub manipulated variables acquired via the sub bus 9.

Figure 14:
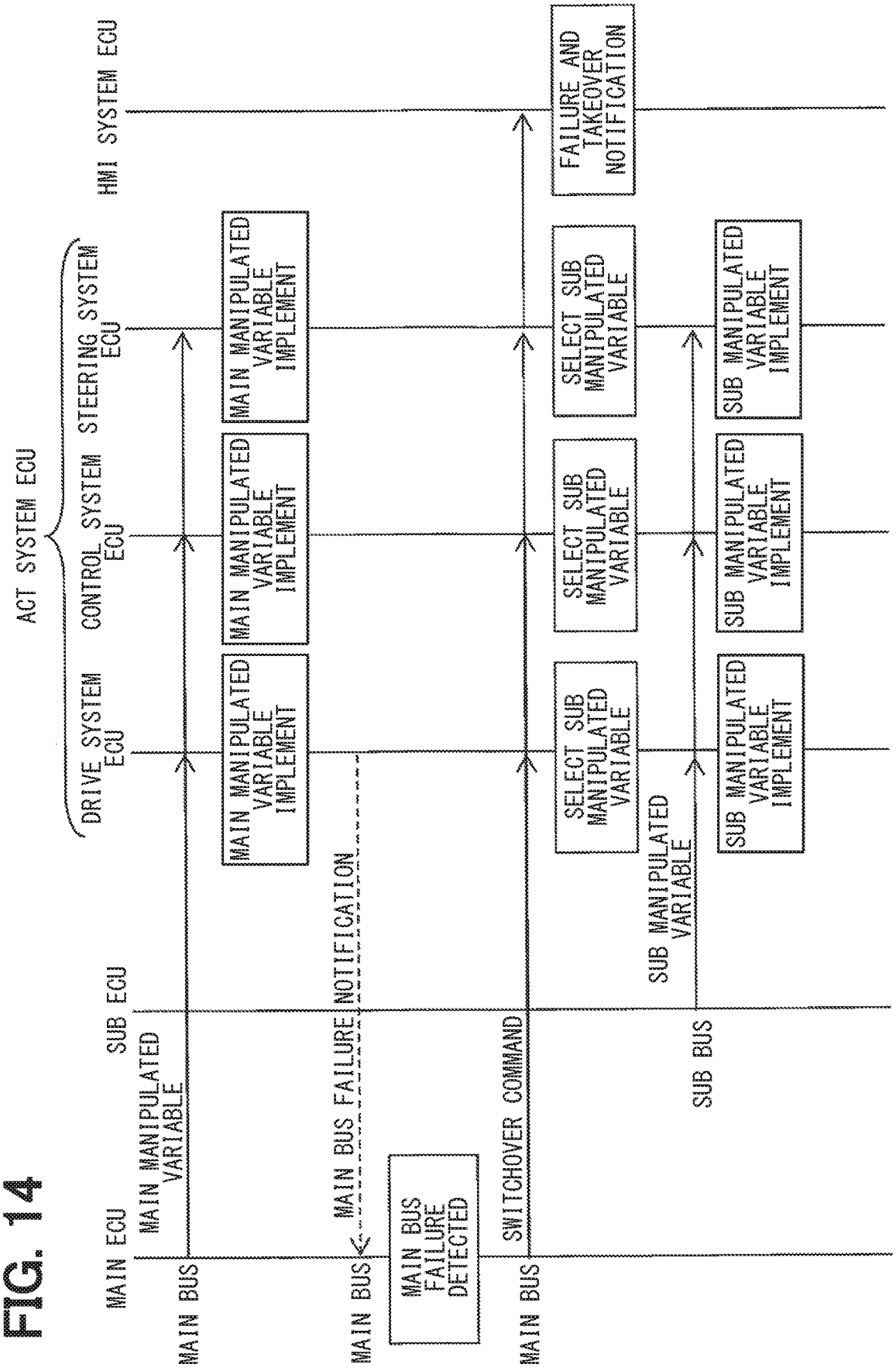
FIG. 14 is an explanatory diagram illustrating an operation for cases where one of ACT system ECUs cannot perform transmission via a main bus.

FIG. 14 illustrates an operation for cases where although the main bus 8 is normal, the drive system ECU 50*a* being one of the ACT system ECUs 50 becomes unable to perform transmission via the main bus 8.

The drive system ECU 50*a*, like the other ACT system ECU 50, transmits the main bus failure notification indicative of "absence of failure". In this case however, the main ECU 30 cannot normally receive the notification from the drive system ECU 50*a*.

In response to the receipt from the drive system ECU 50*a* being stopped for the specified time or longer, the main ECU 30 determines that the communication state of the main bus 8 is abnormal, and transmits the switchover command via the main bus 8.

The HMI system ECU 60 and all of the ACT system ECUs 50 including the drive system ECU 50*a* receive the switchover command, thereby executing the sub manipulated variable selection and the informing to the driver. Thereafter, all the ACT system ECUs 50 execute control according to the sub manipulated variables acquired via the sub bus 9.

Figure 15:
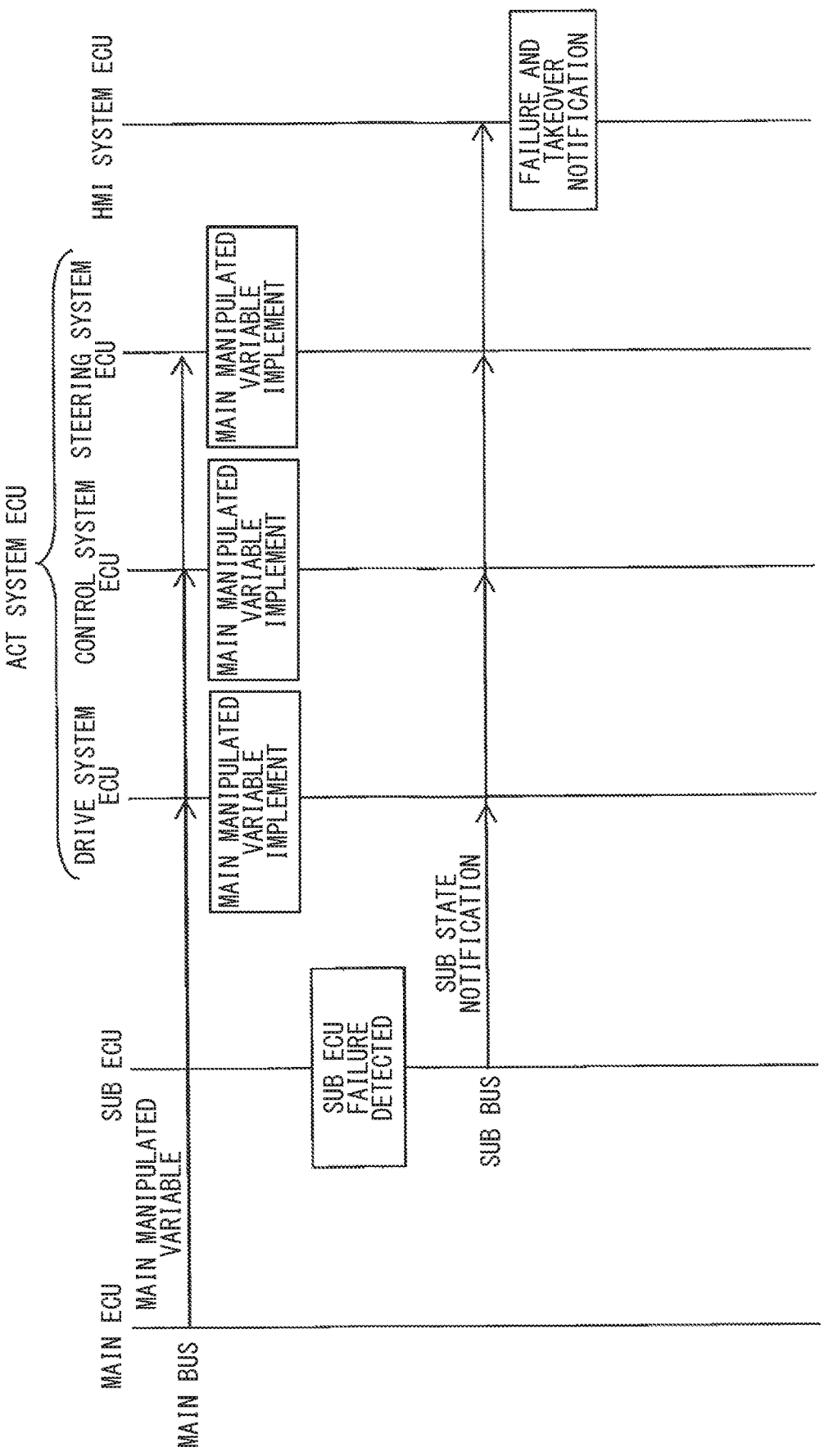
FIG. 15 is an explanatory diagram illustrating an operation for cases where abnormality is detected by a sub ECU.

FIG. 15 illustrates an operation for cases where, during execution of control according to the main manipulated variable, an operation abnormality of the sub computing unit 43 is detected by the sub ECU 40.

All the ACT system ECUs 50 execute control according to the main manipulated variable acquired via the main bus 8. In this case, when abnormality is detected by the sub ECU 40, the sub ECU 40 transmits the sub state via the sub bus 9. The HMI system ECU 60 receiving the sub state executes the informing to the driver.

It is noted that when the receipt via the sub bus 9 is stopped for a specified time or more, the same operation as that shown in FIG. 15 is performed.

Figure 16:
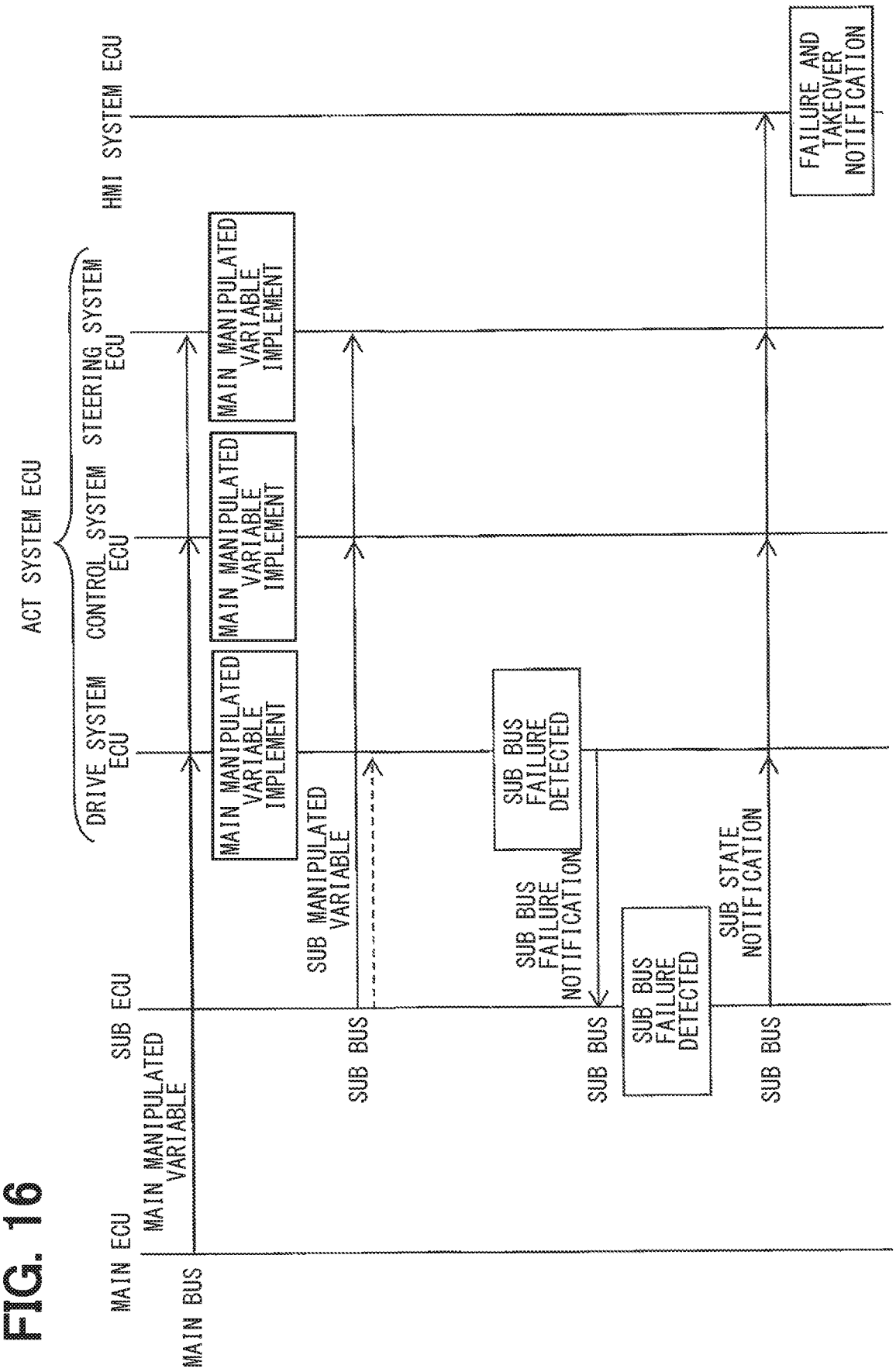
FIG. 16 is an explanatory diagram showing an operation for cases where abnormality of a sub bus is detected by an ACT system ECU.

FIG. 16 illustrates an operation for case where, during execution of control according to the main manipulated variable, the abnormality in the state of communication via the sub bus 9 is detected by the drive system ECU 50*a* being one of the ACT system ECUs 50.

All the ACT system ECUs 50 execute control according to the main manipulated variable acquired via the main bus 8.

In response to, for some reasons, the receipt via the sub bus 9 being stopped for the specified time or longer, the drive system ECU 50*a* transmits the sub bus failure notification via the sub bus 9.

Upon receiving the sub bus failure notification, the sub ECU 40 transmits the sub state via the sub bus 9. The HMI system ECU 60 having received the sub state executes the informing to the driver.

4. Effects

According to the first embodiment described in detail above, the following effects are provided.

(1) The automated driving system 1 is provided with the sub bus 9 connected to the sub ECU 40 separately from the main bus 8 connected to the main ECU 30, and moreover, the transmission and receipt of information on switching over from the main manipulated variable to the sub manipulated variable are performed via the main bus 8. For this reason, the operation of sub ECU 40 and the communication state of sub bus 9 do not affect the operation of the main ECU 30 and the communication state of the main bus 8. As a result, according to the automated driving system 1, the sub ECU 40 and sub bus 9 (hereinafter, sub system) make it possible to, in designing, apply lower safe standard and to simplify designing of a portion relating to the sub system, as compared with the main ECU 30 and main bus 8 (hereinafter, main system). Further, not only when the main ECU 30 fails of course but also when the main bus 8 fails, it is possible to continue the automated driving control using the sub system, and therefore, it is possible to improve reliability of control.

(2) In the automated driving system 1, when abnormality in the state of communication via the main bus 8 is detected by part of the ACT system ECUs 50, the switchover command indicative of "switchover required" is transmitted, causing all of the ACT system ECUs 50 to select the sub manipulated variable. For this reason, even if there is no guarantee that the main manipulated variable and the sub manipulated variable are matched therebetween, all the ACT system ECUs 50 can perform control consistently to each other.

(3) In the automated driving system 1, in cases where abnormality of some kinds is not detected and in cases where it is not necessary to switch over the selection of the manipulated variable, the main bus failure notification, sub bus failure notification, and switchover command indicative of these are transmitted always. For this reason, even if these notifications themselves cannot be transmitted/received due to the failures of the main bus 8 and the sub bus 9, the stop of the receipt of these notifications makes it possible to detect communication state abnormality.

5. Regarding Safety Standard

In normal times, when there is no failure in the main system (specifically, the main bus 8 and the main ECU 30), the information transmitted and received using the sub system (specifically, the sub bus 9 and the sub ECU 40) is not used. For this reason, mere occurrence of failure in the sub system does not immediately cause danger, which is considered as a latent fault of ISO26262. Therefore, even if the highest safety standard "ASIL D" is required of the automated driving system 1 as a whole, the lower safety standard "ASIL B is allowed for the designing of the failure detection of the sub ECU 40 and the designing of the failure detection of the sub bus 9 in each ECU.

In this regard for example, if a configuration in which the main ECU 30 transmits the switchover command using not the main bus 8 but the sub bus 9 is assumed, there is a concern that, in case the sub ECU 40 occupies the sub bus 9, it becomes impossible to transmit the switchover command. This causes a high safety standard to be required of the sub ECU 40 also.

In addition, when noise is superimposed on the sub bus 9, there is a possibility that an incorrect switchover command and an abnormal manipulated variable may transmitted. In this case, there is a possibility that unintended switchover from a normal manipulated variable to an abnormal sub manipulated variable may be executed in the ACT system ECU 50 and an abnormal vehicle behavior may be exhibited. Therefore, a high safety standard is required of the ACT system ECU 50 regarding the failure detection for the sub bus 9.

Further, if a configuration in which the main bus failure notification is transmitted from the ACT system ECU 50 using the sub bus 9, there is a possibility that an erroneous main bus failure and an abnormal sub manipulated variable may be transmitted, as in the above-described case where the noise is superimposed on the sub bus 9. In this case, there is a possibility that the transmission of a switchover command from the main ECU 30 having received the main bus failure may cause unintended switchover from a normal main manipulated variable to an abnormal sub manipulated variable to be executed in all the ACT system ECUs 50, resulting in an abnormal vehicle behavior. Therefore, a high safety standard is required of the ACT system ECUs 50 regarding the failure detection for the sub bus 9.

Specifically, in the automated driving system 1, because the information relating to the switchover from the main manipulated variable to the sub manipulated variable is transmitted and received using the main bus 8, the communication abnormality or failure in the sub bus 9 does not affect normal-time control, wherein the normal-time control uses the main system.

In the automated driving system 1, it is noted that a high safety standard "ASIL D" is required of: the operation determination unit 332, the bus determination unit 333, and the main bus IF unit 32 of the main ECU 30; and the main bus determination unit 531 and the main bus IF unit 51 of the ACT system ECU 50. Further, a low safety standard "ASIL B" is allowed for: the operation determination unit 432, the bus determination unit 433 and the sub bus IF unit 42 of the sub ECU 40; and the sub bus determination unit 532 and the sub bus IF unit 52 of the ACT system ECU 50.

6. Other Embodiments

Although the embodiment of the present disclosure have been described above, the present disclosure is not limited to the above-described embodiment, and it is possible to implement various modifications.

(A) The above embodiment is configured to repeatedly transmit the main bus failure notification, the sub bus failure notification, and the switchover command regardless of whether or not there is the abnormality and whether the manipulated variable switchover is required or unrequired; however, the present disclosure is not limited to this. For example, an alternative configuration may be such that these notifications may be transmitted in cases where there is the abnormality or only in cases where it is necessary to switch over the manipulated variable.

(B) In the above embodiment, the ACT system ECU 50 is configured to perform the switchover from the main manipulated variable to the sub manipulated variable according to the switchover command transmitted from the main ECU 30, but the present disclosure is not limited to this. For example, the ACT system ECU 50 may be configured to perform the switchover according to a main bus failure notification that another ACT system ECU 50 transmits.

(C) In the above embodiment, the main computing unit 33 and the sub computing unit 43 are implemented by separate microcomputers but these may be alternatively implemented by a single microcomputer.

(D) A plurality of functions of one constituent element in the above embodiment may be implemented by a plurality of constituent elements, or one function of one constituent element may be implemented by a plurality of constituent elements. Further, a plurality of functions of a plurality of constituent elements may be implemented by one constituent element, or one function implemented by a plurality of constituent elements may be implemented by one constituent element. Moreover, part of the configuration of the above-described embodiment may be omitted. Further, at least part of the configuration of the above-described embodiment may be added to or replaced with the configuration of another embodiment described above.

(E) In addition to the above-described vehicle control device (specifically, the control command section 3, the control target section 5, the main bus 8 and the sub bus 9), it is possible to implement the present disclosure with various forms such as: a system comprising the vehicle control system; a program causing a computer to function as any of the main processing unit (specifically, the main ECU 30), the sub processing unit (specifically, the sub ECU 40) and the control execution unit (specifically, the ACT-system ECU 50, the HMI system 60) which constitute the vehicle control device; a non-transitory tangible storage medium storing this program such as a semiconductor memory, etc.; and the like.

What is claimed is:
1. A vehicle control device comprising:
a main processing unit configured to repeatedly generate a main manipulated variable being control data used to control automated driving;

a sub processing unit configured to repeatedly generate a sub manipulated variable being control data used to control the automated driving;

a main bus connected to the main processing unit;

a sub bus connected to the sub processing unit; and a control execution unit connected to both the main bus and the sub bus, wherein the control execution unit includes:

a main bus interface unit configured to perform communication via the main bus;

a sub bus interface unit configured to perform communication via the sub bus; and a single computing unit that is configured to communicate with the main bus and the sub bus via the main bus interface unit and the sub bus interface unit, respectively, the single computing unit includes:

a single execution unit configured to execute vehicle control according to a selected manipulated variable, the selected manipulated variable being either the main manipulated variable or the sub manipulated variable;

a single selection unit configured to switch over the selected manipulated variable from the main manipulated variable to the sub manipulated variable when communication performed via the main bus satisfy a preset switchover condition, wherein in an initial state, the main manipulated variable is set to the selected manipulated variable;

a main bus determination unit configured to make a determination of whether or not there is abnormality in communication via the main bus; and a sub bus determination unit configured to make a determination of whether or not there is abnormality in communication via the sub bus, the vehicle control device comprises a plurality of the control execution units, the main processing unit includes a command notification unit configured to transmit a switchover command via the main bus when a preset command condition is satisfied, one of the switchover conditions used in the single selection unit included in the single computing unit is receipt of the switchover command via the main bus, and the main processing unit, the main bus, and the main bus determination unit satisfy a higher safety standard than the sub processing unit, the sub bus, and the sub bus determination unit.

2. The vehicle control device according to claim 1, wherein
the main processing unit further includes a main determination unit configured to repeatedly make a determination of whether or not there is abnormality in at least one of: an operation of the main processing unit; or communication via the main bus, wherein one of the command conditions used in the command notification unit included in the main processing unit is that a result of the determination by the main determination unit is presence of the abnormality.

3. The vehicle control device according to claim 1, wherein
the control execution unit includes:
a main failure notification unit configured to transmit, via the main bus, a bus failure notification indicative of a result of the determination made by the main bus determination unit, wherein one of the command conditions used in the command notification unit included in the main processing unit is at least one of: receipt of the bus failure notification received via the main bus is stopped for a predetermined time or more; or a content of the bus failure notification is presence of the abnormality.

4. The vehicle control device according to claim 3, wherein
one of the switchover conditions used in the single selection unit included in the single computing unit is that the presence of the abnormality is determined by the main bus determination unit.

5. The vehicle control device according to claim 3, wherein
when: the receipt of the control data is stopped for a certain period of time; or content of the control data has an error, the main bus determination unit determines the presence of the abnormality.

6. The vehicle control device according to claim 1, wherein:
the sub processing unit includes:
a sub determination unit configured to make a determination of whether or not there is abnormality in at least one of: an operation of the sub processing unit; or communication via the sub bus; and
a state notification unit configured to transmit, via the sub bus, a sub state indicative of a result of the determination made by the sub determination unit.

7. The vehicle control device according to claim 6, wherein:
the control execution unit includes:
a sub failure notification unit configured to transmit, via the sub bus, a bus failure notification indicative of a result of the determination made by the sub bus determination unit,
wherein the state notification unit of the sub processing unit determines the presence and absence of the abnormality according to the bus failure notification received via the sub bus.

8. The vehicle control device according to claim 1, further comprising:
an informing execution unit that is connected to the main bus and the sub bus, and that is configured to: determine whether or not there is abnormality in communication via the main bus and the sub bus; and perform informing a driver of the vehicle when the presence of the abnormality in at least one of the main bus or the sub bus is determined.

9. A vehicle control device comprising:
a first microcomputer configured to repeatedly generate a main manipulated variable being control data used to control automated driving;
a second microcomputer configured to repeatedly generate a sub manipulated variable being control data used to control the automated driving;
a main bus connected to the first microcomputer;
a sub bus connected to the second microcomputer; and
an electronic control unit connected to both the main bus and the sub bus, wherein
the electronic control unit includes:
a main bus interface unit configured to perform communication via the main bus;
a sub bus interface unit configured to perform communication via the sub bus; and a single computing unit that is configured to communicate with the main bus and the sub bus via the main bus interface unit and the sub bus interface unit, respectively, the single computing unit includes:
- a single execution unit configured to execute vehicle control according to a selected manipulated variable, the selected manipulated variable being either the main manipulated variable or the sub manipulated variable;
- a single selection unit configured to switch over the selected manipulated variable from the main manipulated variable to the sub manipulated variable when communication performed via the main bus satisfy a preset switchover condition, wherein in an initial state, the main manipulated variable is set to the selected manipulated variable;
- a main bus determination unit configured to make a determination of whether or not there is abnormality in communication via the main bus; and
- a sub bus determination unit configured to make a determination of whether or not there is abnormality in communication via the sub bus, the vehicle control device comprises a plurality of the electronic control units, the first microcomputer and the second microcomputer are implemented by separate microcomputers or a single microcomputer, the first microcomputer is further configured to transmit a switchover command via the main bus when a preset command condition is satisfied, one of the switchover conditions used in the single selection unit included in the single computing unit is receipt of the switchover command via the main bus, and the first microcomputer, the main bus, and the main bus determination unit satisfy a higher safety standard than the second microcomputer, the sub bus, and the sub bus determination unit.

* * * * *